(12) United States Patent
Walling et al.

(10) Patent No.: US 12,181,312 B2
(45) Date of Patent: Dec. 31, 2024

(54) LINEAR POSITION SENSING COMPONENTS

(71) Applicant: Honeywell International Inc., Charlotte, NC (US)

(72) Inventors: Joseph M. Walling, Charlotte, NC (US); John Jerred, Charlotte, NC (US); Keith D. Larson, Charlotte, NC (US); Michael Fettig, Charlotte, NC (US); Stephen William Tillotson, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/298,880

(22) Filed: Apr. 11, 2023

(65) Prior Publication Data

US 2023/0251111 A1 Aug. 10, 2023

Related U.S. Application Data

(63) Continuation of application No. 17/197,847, filed on Mar. 10, 2021, now Pat. No. 11,650,081.

(51) Int. Cl.
 *G01D 5/20* (2006.01)
(52) U.S. Cl.
 CPC ..................... *G01D 5/20* (2013.01)
(58) Field of Classification Search
 CPC ............ G01D 5/20; G01D 3/02; G01D 3/036; G01D 3/08; G01D 5/2046
 See application file for complete search history.

(56) References Cited

U.S. PATENT DOCUMENTS

| | | | | | |
|---|---|---|---|---|---|
| 5,111,139 | A | * | 5/1992 | Rose | G01D 5/2013 324/207.22 |
| 5,698,910 | A | * | 12/1997 | Bryant | H02K 11/225 318/135 |
| 5,760,688 | A | * | 6/1998 | Kasai | H03K 17/9547 340/565 |

(Continued)

FOREIGN PATENT DOCUMENTS

| EP | 2818834 A1 | 12/2014 |
|---|---|---|
| EP | 3594630 A1 | 1/2020 |

(Continued)

OTHER PUBLICATIONS

Intention to grant Mailed on Oct. 2, 2023 for EP Application No. 22157449, 9 page(s).

(Continued)

*Primary Examiner* — Akm Zakaria
(74) *Attorney, Agent, or Firm* — Alston & Bird LLP

(57) ABSTRACT

Methods, apparatuses and systems for providing a position sensing component are disclosed herein. An example position sensing component may comprise: a sensing coil; a moveable core disposed within the sensing coil; an oscillator circuit; and a feedback control circuit coupled to the oscillator circuit, wherein the position sensing component is configured to: maintain a fixed amplitude voltage in response to a variable current signal provided by the oscillator circuit in conjunction with the feedback control circuit, and generate an oscillator circuit output signal that is linearly proportional to a position of the moveable core with respect to the sensing coil.

18 Claims, 7 Drawing Sheets

(56) References Cited

U.S. PATENT DOCUMENTS

| | | | |
|---|---|---|---|
| 9,068,815 | B1 | 6/2015 | North et al. |
| 9,110,118 | B2 | 8/2015 | Tillotson |
| 9,995,778 | B1* | 6/2018 | Fiori, Jr. .................. G01D 5/24 |
| 2005/0031133 | A1* | 2/2005 | Browning ............ H04R 29/003 |
| | | | 381/59 |
| 2014/0375331 | A1 | 12/2014 | Wingerter |
| 2015/0286322 | A1* | 10/2015 | Duteil .................. H04B 5/0062 |
| | | | 345/173 |
| 2017/0222469 | A1 | 8/2017 | Tustin et al. |
| 2020/0011708 | A1 | 1/2020 | Hess et al. |

FOREIGN PATENT DOCUMENTS

| | | |
|---|---|---|
| WO | 2001/013070 A1 | 5/2005 |
| WO | 2015/153158 A1 | 10/2015 |

OTHER PUBLICATIONS

U.S. Appl. No. 17/197,847, filed Mar. 10, 2021, U.S. Pat. No. 11,650,081, Issued.

Examiner Interview Summary Record (PTOL-413) Mailed on Nov. 8, 2022 for U.S. Appl. No. 17/197,847, 3 page(s).

Final Rejection Mailed on Sep. 14, 2022 for U.S. Appl. No. 17/197,847, 18 page(s).

Non-Final Rejection Mailed on May 18, 2022 for U.S. Appl. No. 17/197,847, 15 page(s).

Notice of Allowance and Fees Due (PTOL-85) Mailed on Jan. 11, 2023 for U.S. Appl. No. 17/197,847.

Office Action Appendix Mailed on Nov. 8, 2022 for U.S. Appl. No. 17/197,847, 2 page(s).

European search report Mailed on Aug. 5, 2022 for EP Application No. 22157449, 6 page(s).

Decision to grant a European patent Mailed on Mar. 7, 2024 for EP Application No. 22157449, 2 page(s).

* cited by examiner

LINEAR POSITION SENSING COMPONENTS

CROSS-REFERENCE TO RELATED APPLICATIONS

This patent application is a continuation of U.S. patent application Ser. No. 17/197,847, filed Mar. 10, 2021, which is incorporated herein by reference in its entirety.

BACKGROUND

Position sensing components (e.g., position sensors, proximity switches, and/or the like) may be used in a variety of applications to detect an absolute or relative position (e.g., when a component is within a predetermined distance of a reference location). Many position sensing components are plagued by technical challenges and limitations.

Through applied effort, ingenuity, and innovation, many of these identified problems have been solved by developing solutions that are included in embodiments of the present disclosure, many examples of which are described in detail herein.

BRIEF SUMMARY

Various embodiments described herein relate to position sensing methods, apparatuses, and systems.

In accordance with various examples of the present disclosure, a position sensing component is provided. The position sensing component may comprise a sensing coil; a moveable core disposed within the sensing coil; an oscillator circuit; and a feedback control circuit coupled to the oscillator circuit, wherein the position sensing component is configured to: maintain a fixed amplitude voltage in response to a variable current signal provided by the oscillator circuit in conjunction with the feedback control circuit, and generate an oscillator output signal that is linearly proportional to a position of the moveable core with respect to the sensing coil.

In accordance with various examples of the present disclosure, a method for measuring a position of a moveable core with respect to a sensing coil is provided. The method may comprise: providing, by an oscillator circuit in conjunction with a feedback control circuit, a variable current signal; maintaining, by the sensing coil, a fixed amplitude voltage in response to the variable current signal; and generating, by the oscillator circuit, an oscillator output signal that is linearly proportional to a position of the moveable core with respect to the sensing coil.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
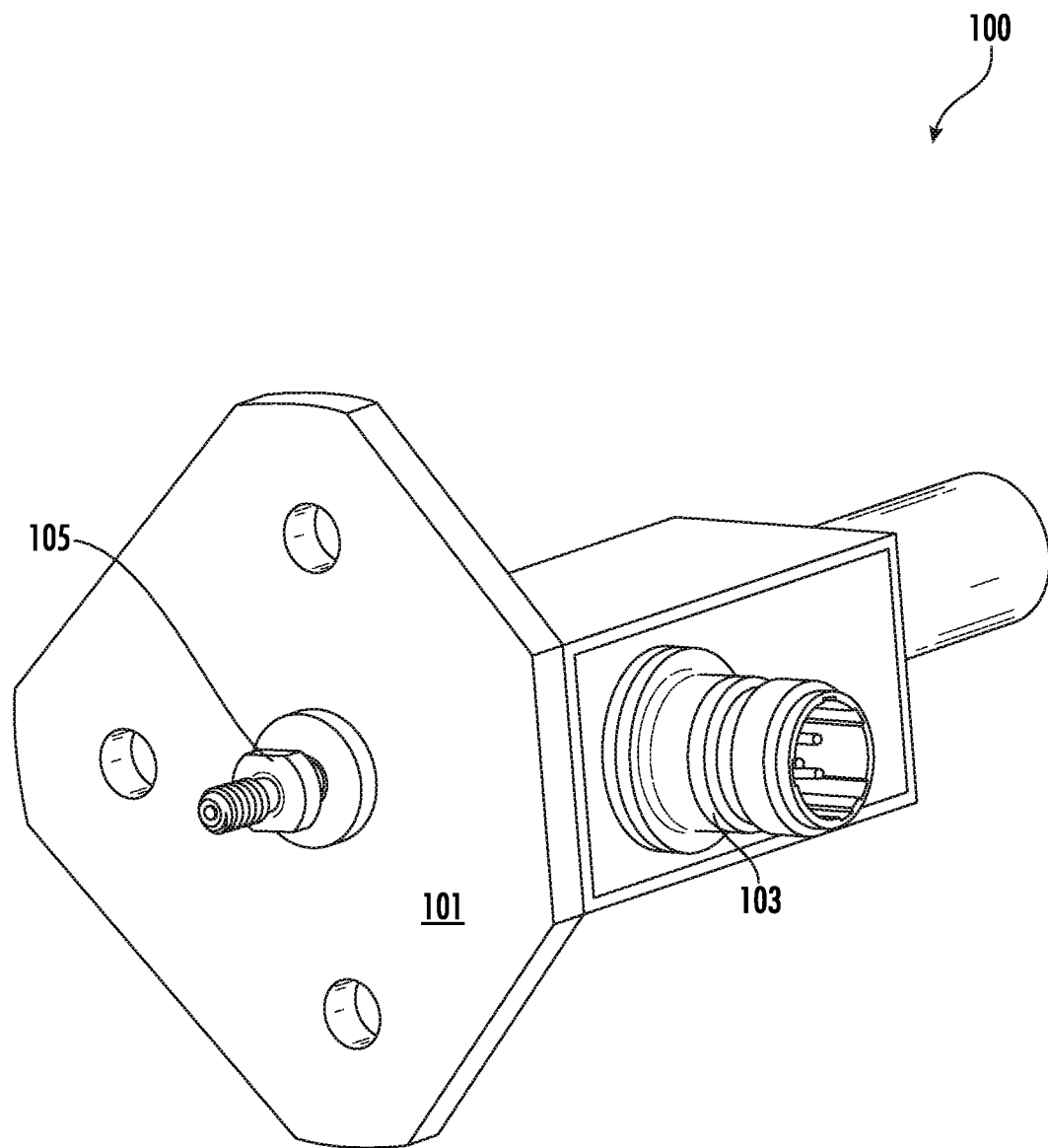
FIG. 1 illustrates an example position sensing component in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, an example processing circuitry, communication module, input/output module, memory, flame detecting component) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "position sensing component" may refer to a device that is configured to measure a mechanical position. In various examples, a position sensing component may be configured to detect an absolute position (e.g., a location or presence of an object) or a relative position (e.g., a displacement of an object from a reference point). Position sensing components may be utilized in a variety of applications (e.g., electromechanical applications, automotive, aerospace, and/or the like). By way of example, position sensing components may be utilized to determine whether or not at least a portion of the example system should be enabled or disabled based on being within or outside a predetermined distance of a reference location. In various examples, position sensing components may be configured to generate an electrical signal/output indicative of a position or linear displacement with respect to a reference point. In one example, a linear variable differential transformer (LVDT) is an electromagnetic transducer that can convert the motion of an object that is coupled mechanically thereto into a corresponding electrical signal/output. In another example, a Hall-effect sensor can detect a magnitude of an electric field and generate an electrical signal/output proportional to the strength of the magnetic field.

Traditionally, a braking system may utilize a metal pin (e.g., cylinder, rod, and/or the like) as a position sensing component. The example metal pin may be disposed adjacent a surface of a braking mechanism such that the example metal pin is physically displaced with respect to the braking mechanism as a result of wearing over time (e.g., as the pin retreats into the braking mechanism). In such examples, a condition of the braking system is usually determined by visually monitoring and inspecting the displacement/position of the metal pin. In such cases, it may not be possible to remotely/automatically monitor the condition of the braking system over time.

In general, existing position sensing components (e.g., LVDTs and Hall-effect sensors) may not be suitable for implementation in a variety of applications with harsh environments (e.g., dirty and/or high-vibrational environments, including the braking system described above). For example, existing position sensing components may comprise complex circuitry and/or elements that are not suitable for such harsh environments and may be difficult or expensive to implement. Further, existing example position sensing components do not provide an inherently linear output and cannot easily be configured to provide data in a useable form. For example, a DC input/DC output may be required for providing data/information via electrical signals/outputs.

By way of example, an LVDT, in some examples, may comprise a complex configuration of three electrical coils. Additionally, due to its native AC input/AC output and high current draw characteristics, the example LVDT may require a significant amount of additional circuitry in order to provide data in a useable form. Such additional circuitry may not be suitable for harsh environments. Further, existing position sensing components (e.g., proximity switches) are only capable of provide a non-linear output over a very small distance (e.g., 3-5 mm). In another example, an example Hall-effect sensor may not suitable for the aforementioned harsh environments due to the presence of permanent magnet(s). For instance, if implemented in the braking system discussed above, the example Hall-effect sensor may collect additional ferrous material as the brakes wear over time, adversely affecting the performance of the sensor.

In accordance with various embodiments of the present disclosure, example methods, apparatuses and systems are provided.

In various embodiments, the present disclosure may provide a position sensing component. The example position sensing component may comprise a sensing coil, a moveable core disposed within the sensing coil, an oscillator circuit and a feedback control circuit coupled to the oscillator circuit. The position sensing component may be configured to maintain a fixed amplitude voltage in response to a variable current signal provided by the oscillator circuit in conjunction with the feedback control circuit, and generate an oscillator output signal that is linearly proportional to a position of the moveable core with respect to the sensing coil. In some examples, the position sensing component may further comprise a health monitoring circuit configured to provide an oscillator output status signal. In some examples, the oscillator output signal is further linearized by passing the oscillator output signal through a linearization circuit. In some examples, the position sensing component, the linearization circuit comprises a low-pass filter and an amplifier circuit. In some examples, the linearization circuit further comprises temperature compensation. In some examples, the oscillator circuit may comprise a modified Colpitts oscillator. In some examples, the health monitoring circuit may comprise a metal-oxide-semiconductor field-effect transistor (MOSFET) switch. In some examples, the position sensing component may comprise a DC input/DC output. In some examples, the position sensing component may be operatively coupled with a controller component. In some examples, the oscillator status output signal may be transmitted to the controller component. In some examples, the position sensing component may comprise an Analog-to-Digital Converter (ADC).

Using the apparatuses and techniques of the present disclosure, a robust position sensing component that is suited, in some examples, to operate efficiently in harsh environments and is capable of generating an inherently linear output signal using a DC input voltage is provided. An example linear position sensing component may comprise a variable reluctance coil with oscillator feedback control. Accordingly, without the shortcomings associated with magnet-based and other technologies discussed herein, integral health monitoring capabilities may be provided. The example position sensing component can easily be manufactured at a low cost in comparison to existing devices (e.g., an LVDT) and provides a more accessible interface (e.g., DC input/DC output) for data transmission purposes. Additionally, the example position sensing component can easily be combined with an Analog-to-Digital converter (ADC) and configured to provide a wired or wireless digital output (e.g., RS-485, BLE, and/or the like).

Referring now to FIG. 1, a schematic diagram depicting an example position sensing component 100 in accordance with various embodiments of the present disclosure is provided. In particular, as depicted, the example position sensing component 100 comprises a housing 101, a moveable core 105 and a connecting element 103.

In various examples, as depicted in FIG. 1, the example position sensing component 100 comprises a housing 101.

In various embodiments, the housing 101 of the position sensing component 100 may be configured to contain one or more elements of the example position sensing component 100 (e.g., an example moveable core and an example sensing coil). In various embodiments, the one or more elements of the example position sensing component may be at least partially disposed within the example housing 101. In various embodiments, the example housing 101 may comprise stainless steel, aluminum, or similar metals providing a robust and resilient component suitable for harsh environments.

As noted above and as depicted in FIG. 1, the example position sensing component 100 comprises a moveable core 105. As depicted, the moveable core 105 comprises a cylindrical member (e.g., rod, pin, and/or the like) configured to be at least partially disposed disposed within the housing 101 of the position sensing component 100 (e.g., within the sensing coil). In various examples, the moveable core 105 may define a hollow center. In some examples, the moveable core 105 may comprise a conductive and/or ferrous material (e.g., metal) and may be any suitable length (e.g., 1-2 inches long). In various embodiments, the moveable core 105 may be capable of producing eddy currents to elicit a change of inductance in an example sensing coil.

In some examples, as depicted in FIG. 1, the example position sensing component 100 comprises a connecting element 103. In various examples, the example connecting element 103 may operate to electrically connect a processing element/processing circuitry of the example position sensing component 100 to another electrical element/component such that data/information can be exchanged between the example position sensing component 100 and the electrical element/component. By way of example, the connecting element 103 may be utilized to connect the example position sensing component 100 to an example braking mechanism/system.

While some of the embodiments herein provide an example position sensing component 100, it is noted that the present disclosure is not limited to such embodiments. For instance, in some examples, a position sensing component 100 in accordance with the present disclosure may comprise other elements, one or more additional and/or alternative elements, and/or may be structured/positioned differently than that illustrated in FIG. 1.

Figure 2A:
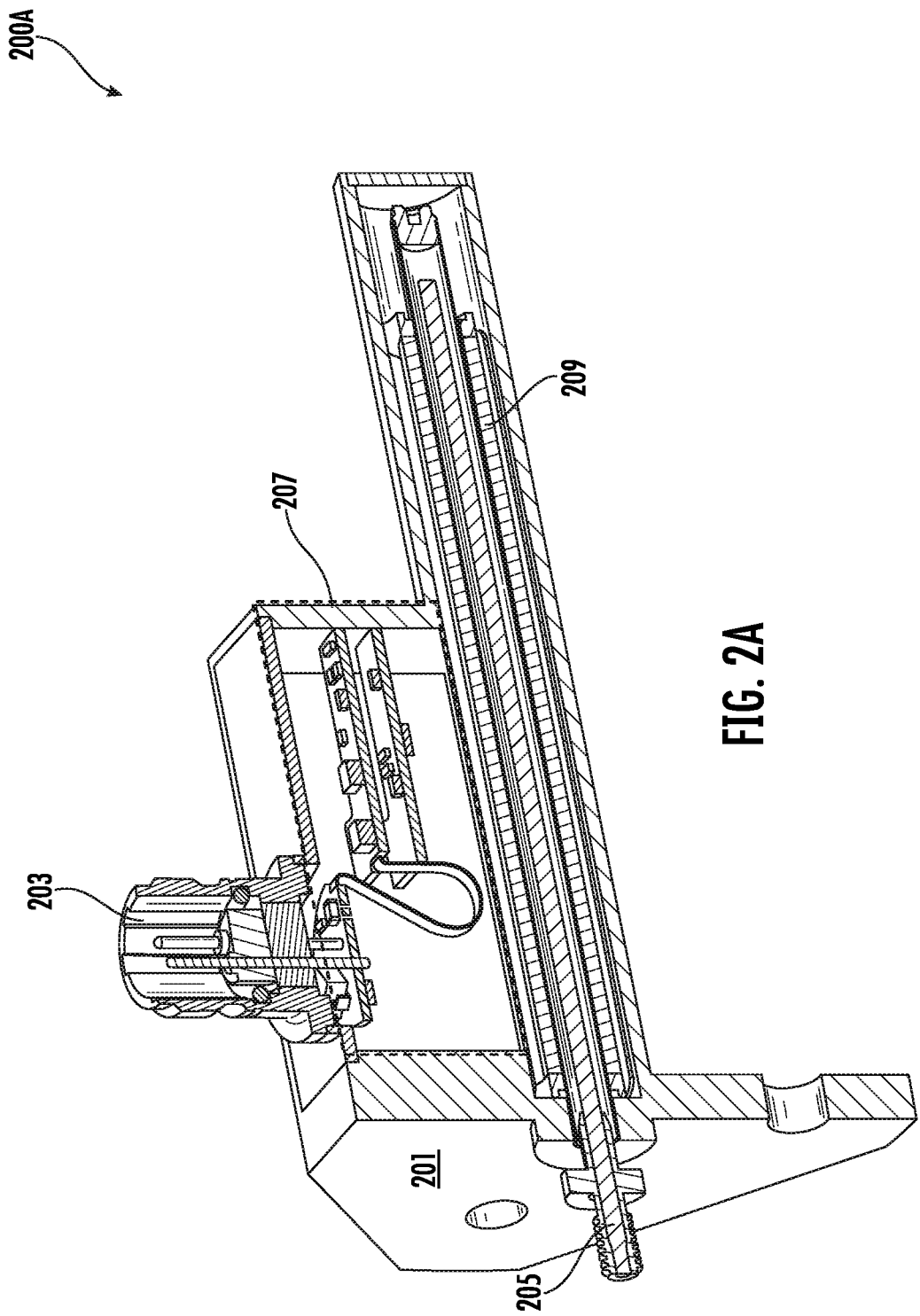
FIG. 2A illustrates an example cross-sectional view of an example position sensing component in accordance with various embodiments of the present disclosure.

Referring now to FIG. 2A, an example schematic diagram depicting an example position sensing component 200A in accordance with various embodiments of the present disclosure is provided. In particular, as depicted, the example position sensing component 200A comprises a housing 201, a connecting element 203, a moveable core 205, a sensing coil 209 and a processing element 207.

As depicted in FIG. 2A, the example position sensing component 200A comprises a moveable core 205. The example moveable core 205 may be or comprise a cylindrical member (e.g., rod, pin, and/or the like) of any length centrally disposed within the sensing coil 209. In various examples, the moveable core 205 may define a hollow center. In some examples, the moveable core 205 may comprise a conductive metal and/or ferrous material. As depicted, the moveable core 205 and the sensing coil 209 may be at least partially disposed within the housing 201 of the position sensing component 200A. In some examples, the housing 201 of the position sensing component 200A may comprise stainless steel or the like. The length of the example moveable core 205 (e.g., rod) may, in some examples, be the same length as the sensing coil 209. In various examples, as depicted, when completely disposed within the sensing coil 209, the arrangement of the moveable core 205 and sensing coil 209 may provide a maximum inductance output.

As depicted in FIG. 2A, the example position sensing component 200A comprises a sensing coil 209. The example sensing coil 209 may be or comprise a solenoidal coil, a variable reluctance coil, or the like. The example sensing coil 209 may be or comprise an AC coil with a constantly alternating magnetic field. Accordingly, in various examples, the example sensing coil 209 will not accumulate ferrous materials over time as is the case with many magnet-based technologies (e.g., Hall-effect sensors). The example sensing coil 209 may be positioned with respect to the example moveable core 205 such that the inductance of the example sensing coil 209 is at a maximum value when the moveable core 205 is fully engaged therein and at a minimum value when the moveable core 205 is fully removed (e.g., displaced) from within the sensing coil 209. As depicted, the example moveable core 205 is fully engaged within the sensing coil 209. In various examples, the sensing coil 209 geometry may be arranged as so to provide an exponential change in inductance to accommodate a simplified oscillator and feedback control circuit. In some examples, the sensing coil 209 may be configured such that a number of turns is distributed evenly (e.g., across a length of a bobbin), providing a linear change in inductance corresponding to a linear movement in the moveable core 205 (e.g., rod). The example sensing coil 209 may also be configured to provide different inductance profiles corresponding to a linear movement of the moveable core 205. The dimensions (e.g., lengths) of the sensing coil 209 and the moveable core 205 may vary. In various examples, an example oscillator circuit, feedback control circuit, and position sensing component dimensions (e.g., sensing coil 209 and moveable core 205 dimensions) may be modified to accommodate larger or smaller components/devices. In some examples, the sensing coil 209 may feature an increased number of turns in certain locations of the example moveable core 205 to provide an increased sensitivity and resolution in particular areas of interest. Further, a custom sensing coil profile may be configured to produce a non-linear output corresponding to a similarly non-linear system (e.g., in some embodiments, the moveable core 205 may be driven by a non-linear cam system).

In various embodiments, the example position sensing component 200A may comprise one or more processing elements and/or one or more processing circuitries configured to execute various functions of the position sensing component 200A. For example, as depicted in FIG. 2A, the example position sensing component 200A comprises a processing element 207 comprising one or more circuitries. As depicted in FIG. 2A, the example processing element 207 may be or comprise a printed circuit board assembly (PCBA). In some examples, the processing element 207 may comprise an oscillator circuit, a feedback control circuit, a health monitoring circuit and/or a linearization circuit.

As depicted in FIG. 2A, the example position sensing component 200A comprises a connecting element 203. In various examples, the example connecting element 203 may operate to electrically connect a processing element/processing circuitry (e.g., an example PCBA) of the example position sensing component 200A to another electrical element/component such that data/information can be exchanged between the example position sensing component 200A and the electrical element/component. In one example, the connecting element 203 may be utilized to connect the example position sensing component 200A to an example braking mechanism/system.

Figure 2B:
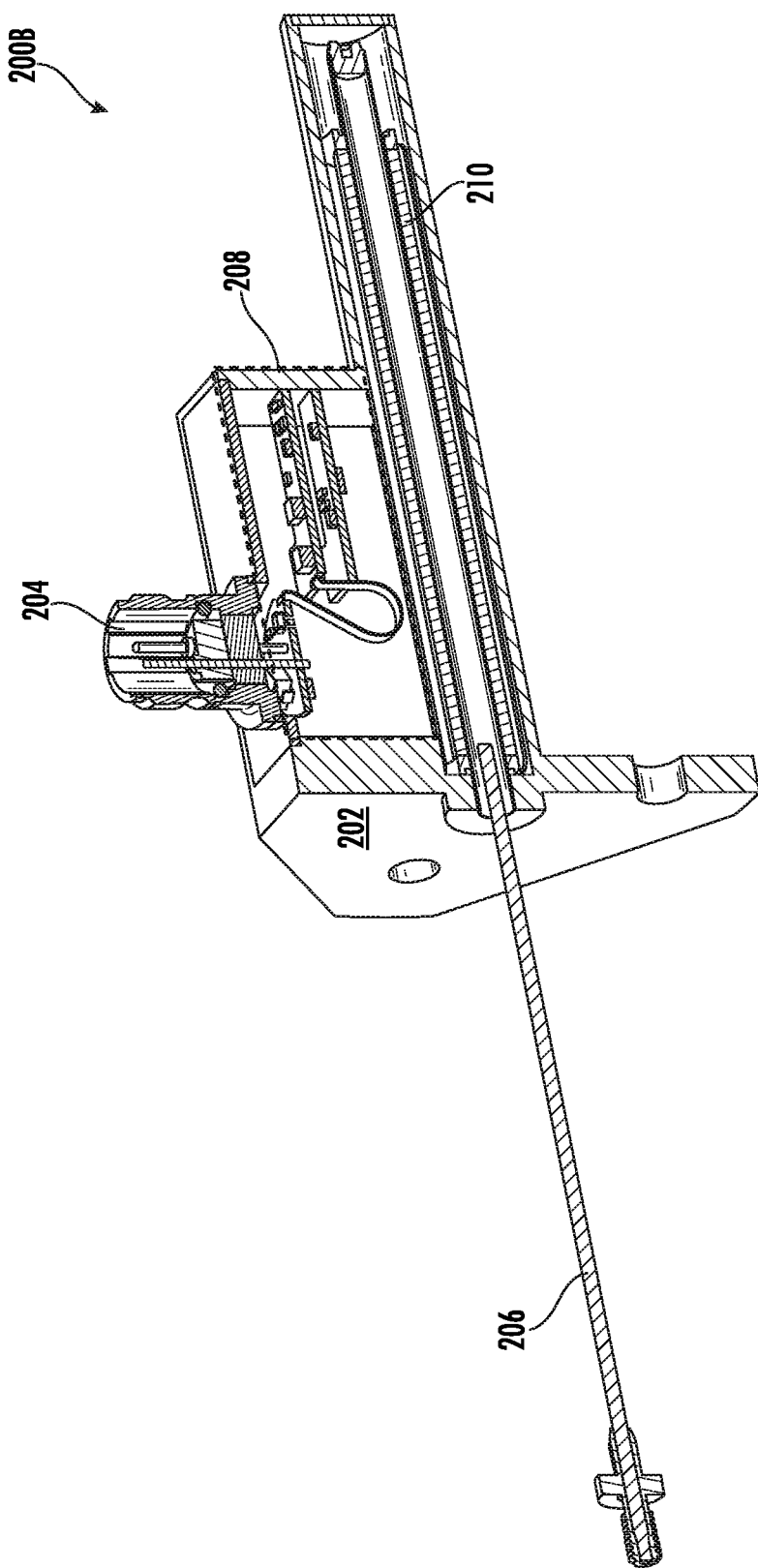
FIG. 2B illustrates an example cross-sectional view of an example position sensing component in accordance with various embodiments of the present disclosure.

Referring now to FIG. 2B, an example schematic diagram depicting an example position sensing component 200B in accordance with various embodiments of the present disclosure is provided. The example position sensing component 200B may be similar or identical to the position sensing component 200A discussed above in connection with FIG. 2A. In particular, as depicted, the example position sensing component 200B comprises a housing 202, a connecting element 204, a moveable core 206, a processing element 208 and a sensing coil 210.

As depicted in FIG. 2B, the example position sensing component 200B comprises a moveable core 206. The example moveable core 206 may be or comprise a cylindrical member (e.g., rod, pin, and/or the like) of any suitable length centrally disposed within the sensing coil 210. In various examples, the moveable core 206 may define a hollow center. In various examples, the moveable core 206 may comprise a conductive metal and/or ferrous material. As depicted, the moveable core 206 and the sensing coil 210 may be at least partially disposed within the housing 202 of the position sensing component 200B. In some examples, the housing 202 of the position sensing component 200B may comprise stainless steel or the like. The length of the example moveable core 206 (e.g., rod) may, in some examples, be the same length as the sensing coil 210. In various examples, as depicted, when fully removed (i.e., displaced) from within the sensing coil 210, the arrangement of the moveable core 206 and sensing coil 210 may provide a minimum inductance output.

As depicted in FIG. 2B, the example position sensing component 200B comprises a sensing coil 210. The example sensing coil 210 may be or comprise a solenoidal coil, a variable reluctance coil, or the like. The example sensing coil 210 may be or comprise an AC coil with a constantly alternating magnetic field. The example sensing coil 210 may be positioned with respect to the example moveable core 206 such that the inductance of the example sensing coil 210 is at a maximum value when the moveable core 206 is fully engaged therein and at a minimum value when the moveable core 206 is fully removed (e.g., displaced) from within the sensing coil 210. As depicted, the example moveable core 206 is fully removed/displaced from within the example sensing coil 210. In various examples, the sensing coil 210 geometry may be arranged as so to provide an exponential change in inductance to accommodate a simplified oscillator and feedback control circuit. As noted above, the example sensing coil 210 may also feature an increased number of turns in certain locations of the example moveable core 205 to provide an increased sensitivity and resolution in particular areas of interest.

In various embodiments, the example position sensing component 200B may comprise one or more processing elements and/or one or more processing circuitries configured to execute various functions of the position sensing component 200B. For example, as depicted in FIG. 2B, the example position sensing component 200B comprises a processing element 208 comprising one or more circuitries. As further depicted in FIG. 2A, the example processing element 207 may be or comprise a PCBA. In some examples, the processing element 208 may comprise an oscillator circuit, a feedback control circuit, a health monitoring circuit and/or a linearization circuit.

As depicted in FIG. 2B, the example position sensing component 200B comprises a connecting element 204. In various examples, the example connecting element 204 may operate to electrically connect a processing element/processing circuitry of the example position sensing component 200B to another electrical element/component such that data/information can be exchanged between the example position sensing component 200B and the electrical element/component. In one example, the connecting element 204 may be utilized to connect the example position sensing component 200B to an example braking mechanism/system.

While some of the embodiments herein provide example position sensing components 200A and 200B, it is noted that the present disclosure is not limited to such embodiments. For instance, in some examples, position sensing components 200A and 200B in accordance with the present disclosure may comprise other elements, one or more additional and/or alternative elements, and/or may be structured/positioned differently than that illustrated in FIG. 2A and FIG. 2B.

Figure 3:
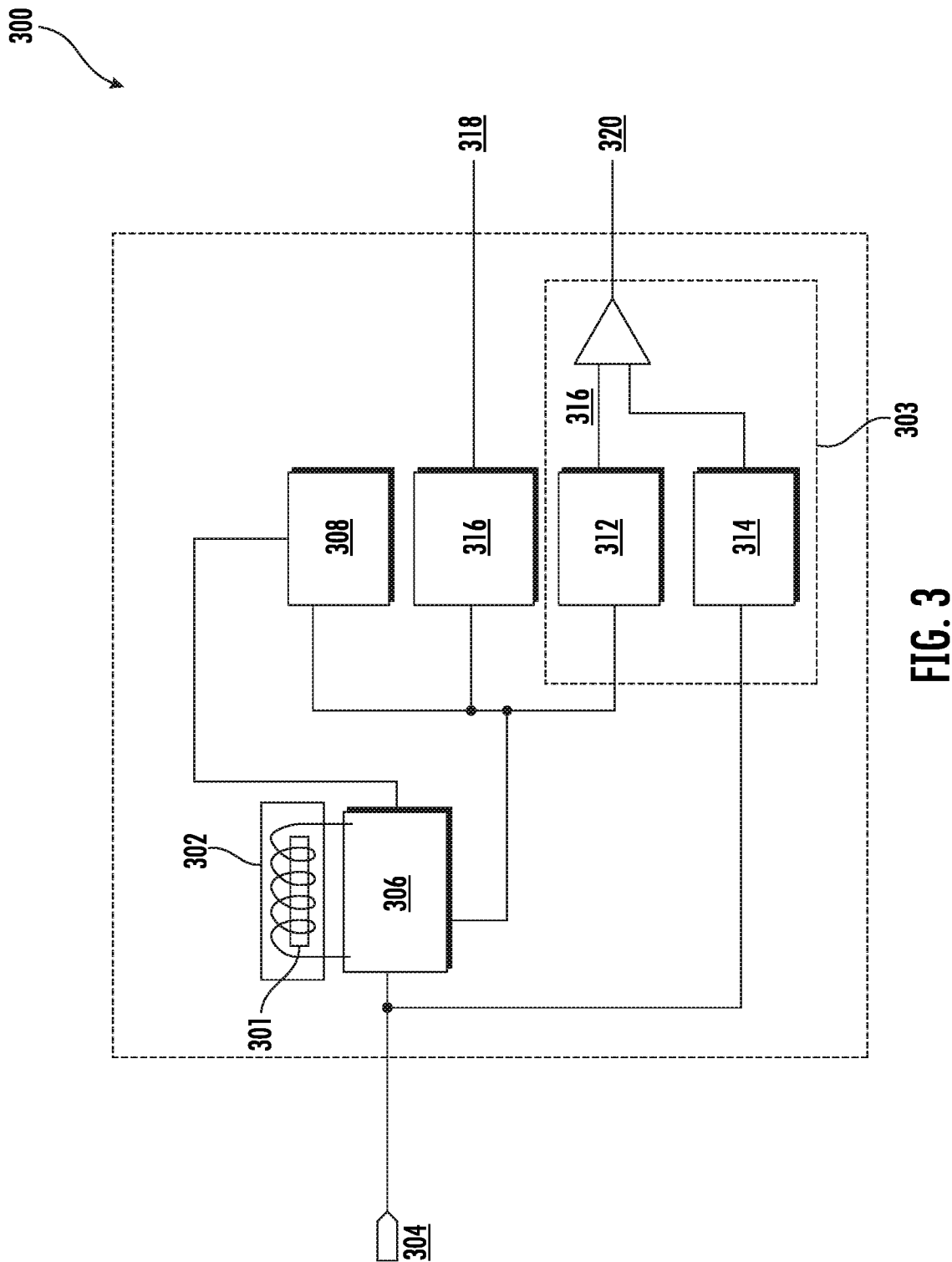
FIG. 3 illustrates an example schematic block diagram depicting an example position sensing component in accordance with various embodiments of the present disclosure.

Referring now to FIG. 3, an example schematic diagram depicting an example position sensing component 300 in accordance with various embodiments of the present disclosure is provided. In particular, as depicted, the example position sensing component 300 comprises a moveable core 301, a sensing coil 302, a DC voltage supply 304, an oscillator circuit 306, a feedback control circuit 308, a health monitoring circuit 310 and a linearization circuit 303.

As depicted in FIG. 3, the example position sensing component 300 comprises a moveable core 301 and a sensing coil 302.

The example moveable core 301 may be or comprise a cylindrical member (e.g., rod, pin, and/or the like) of any length centrally disposed within the sensing coil 302. In various examples, the moveable core 301 may define a hollow center. In some examples, the moveable core 301 may comprise a conductive metal. The example sensing coil 302 may be or comprise a solenoidal coil. The moveable core 301 and the sensing coil 302 may be at least partially disposed within a housing of the position sensing component 300. In some examples, the housing of the position sensing component 300 may comprise stainless steel or similar metals providing a robust and resilient component suitable for harsh environments.

In various examples, the sensing coil 302 may be or comprise a variable reluctance coil. The example sensing coil 302 may be or comprise an AC coil with a constantly alternating magnetic field. Accordingly, the example sensing coil 302 will not accumulate ferrous materials over time as is the case with many magnet-based technologies (e.g., Hall-effect sensors). The example sensing coil 302 may be wound around the body of the moveable core 301 such that the inductance of the sensing coil 302 is at a maximum value when the moveable core 301 is fully engaged therein and at a minimum value when the moveable core 301 is fully removed (e.g., displaced) from within the sensing coil 302. By way of example, when implemented in a braking system, when an example metal pin is fully engaged within the coil, a maximum reluctance value is exhibited. However, as the example metal pin retreats and the sensing coil 302 becomes exposed to air over time, the reluctance value will reduce. Accordingly, an electrical output/signal corresponding to the position of the pin may be generated. As such, in various examples, the moveable core 301 and the sensing coil 302 may provide a variable inductor for the example oscillator circuit 306. In various applications, the geometry of the sensing coil 302 may be varied to linearize the oscillator circuit output signal and/or to provide custom configurations for specialized applications. In some examples the sensing coil 302 geometry may be arranged as so to provide an exponential change in inductance to accommodate a simplified oscillator and feedback control circuit. The sensing coil 302 may also feature an increased number of turns in certain locations of the moveable core 301 to provide an increased sensitivity and resolution in particular areas of interest. Further, a custom coil profile may be produced to produce a non-linear output corresponding to a similarly non-linear system.

In various embodiments, as depicted, the position sensing component 300 is connected to a DC voltage supply 304. In some examples, the DC voltage supply 304 may be provided via a battery or energy harvesting. While some of the embodiments herein provide an example position sensing component 300, it is noted that the present disclosure is not limited to such embodiments. For instance, in some examples, a wired connection may be provided.

As depicted in FIG. 3, the example position sensing component 300 comprises an oscillator circuit 306 configured to provide an electrical output/signal to drive the sensing coil 302 and moveable core 301. In various embodiments, the example oscillator circuit 306 may provide a variable current signal to drive the sensing coil 302 in conjunction with moveable core 301 such that a fixed amplitude voltage across the sensing coil 302 is maintained. Said differently, as impedance decreases, the current draw increases in order to maintain a voltage at a fixed amplitude. The current draw may be measured to provide an electrical output/signal corresponding to the impedance of the sensing coil 302 and thus, the position of the moveable core 301. In various examples, the current draw required to maintain a fixed amplitude voltage is linearly proportional to the position of the moveable core 301 with respect to the sensing coil 302.

As depicted in FIG. 3, the example position sensing component 300 comprises a feedback control circuit 308. As noted above, as the reluctance/impedance of the sensing coil 302 changes in response to movement of the moveable core 301, a variable current signal drawn by the sensing coil 302 will increase in order to maintain a target voltage (i.e., a fixed amplitude voltage). In various examples, the feedback control circuit 308 may be configured to monitor a variable current output/signal and control the operation of the oscillator circuit 306

In some embodiments, as depicted in FIG. 3, the position sensing component 300 comprises a health monitoring circuit 310. As depicted in FIG. 3, the example health monitoring circuit 310 may be configured to monitor a variable current signal used by the oscillator circuit 306 to maintain a target voltage (i.e., fixed amplitude voltage). As such, the health monitoring circuit 310 may be utilized to monitor output characteristics indicative of the health of the example position sensing component 300. In turn, these output characteristics may be processed to provide defined ranges for target output values and outside-of-range values associated with the position sensing component 300. For example, in various embodiments, the example health monitoring circuit 310 may be or comprise a comparator circuit configured to generate signals corresponding to various outside-of-range conditions including, but not limited to, temperature conditions, high impedance, an open sensing coil, low impedance, a short sensing coil condition, and/or the like. By way of example, the oscillator circuit output signal detected by the health monitoring circuit 310 may be very high in response to an open sensing coil condition or very low in response to a short sensing coil condition. In various examples, the health monitoring circuit 310 may be configured to provide an oscillator circuit 306 status (e.g., "High=Active" or "Low=Error"). In some examples, the position sensing component 300 may comprise an ADC configured to convert one or more outputs of the position sensing component 300 (e.g., an oscillator circuit status output signal) in order to provide a wired or wireless digital output (e.g., RS-485, BLE, and/or the like).

While some of the embodiments herein provide an example position sensing component 300 comprising a health monitoring circuit 310, it is noted that the present disclosure is not limited to such embodiments. For instance, in some examples, a position sensing component 300 in accordance with the present disclosure may not comprise a health monitoring circuit 310, or may comprise a different health monitoring circuit 310.

In some embodiments, as depicted in FIG. 3, the position sensing component 300 comprises a linearization circuit 303 configured to further linearize the electrical signal/output of the oscillator circuit 306. As discussed above, while the output of the position sensing component 300 is inherently linear, in some applications, a linearization circuit 303 may be provided (e.g., in order to provide additional temperature compensation capabilities). In some examples, as depicted, the linearization circuit 303 may comprise a low pass filter circuit 312, a reference voltage circuit 314 and an output gain adjustment circuit 316. In some examples, the linearization circuit 303 may be utilized to provide additional functionalities (e.g., temperature compensation, calibration and/or the like). For example, a lookup table may be provided for calibration, temperature compensation and/or the like.

While some of the embodiments herein provide an example position sensing component 300 comprising a linearization circuit 303, it is noted that the present disclosure is not limited to such embodiments. For instance, in some examples, a position sensing component 300 in accordance with the present disclosure may not comprise a linearization circuit 303. In other examples, the linearization circuit 303 may comprise other elements one or more additional and/or alternative elements, and/or may be structured/positioned differently than that illustrated in FIG. 3.

Figure 4:
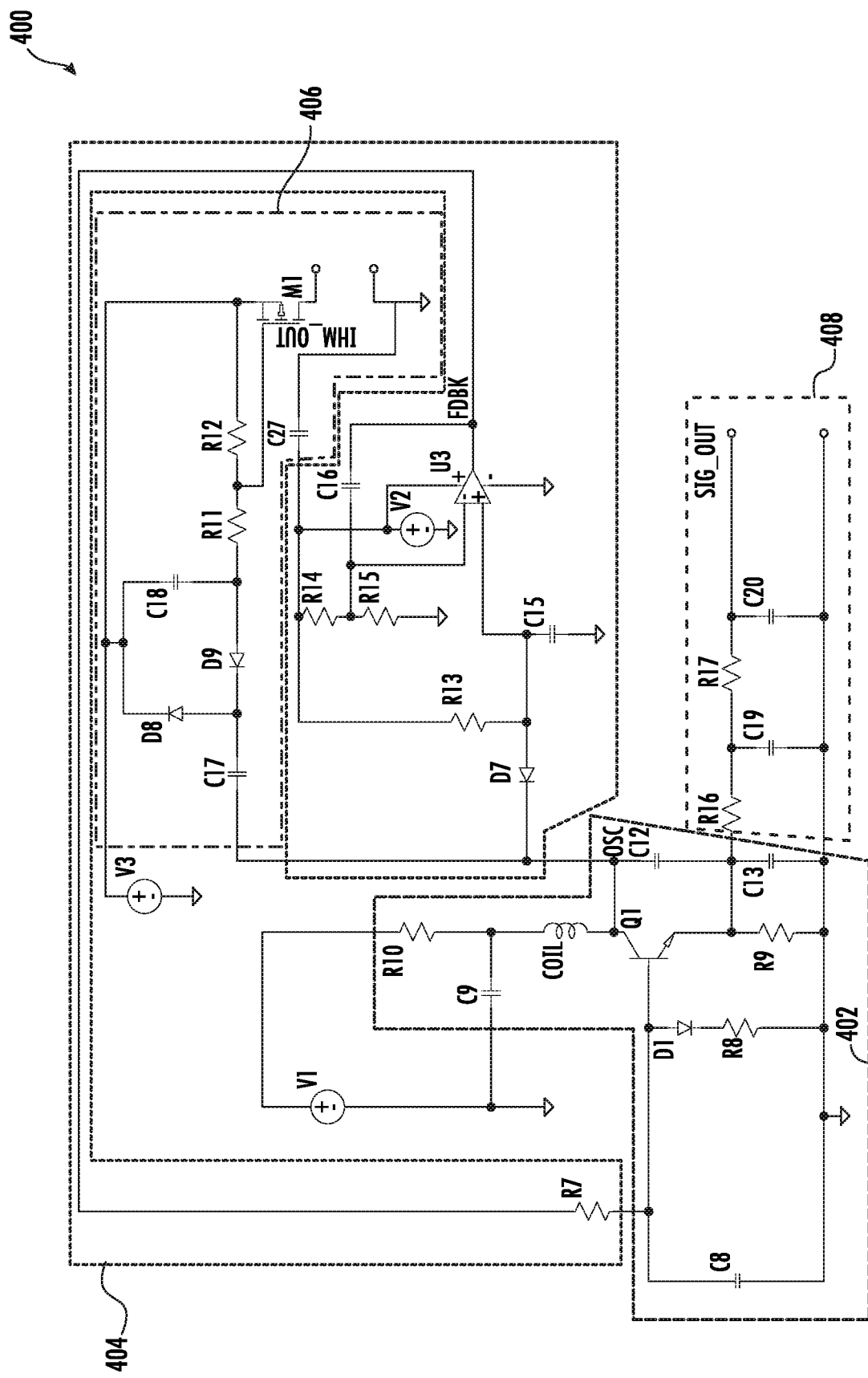
FIG. 4 illustrates an example schematic circuit diagram in accordance with various embodiments of the present disclosure.

Referring now to FIG. 4, an example schematic circuit diagram depicting at least a portion of an example position sensing component 400 in accordance with various embodiments of the present disclosure is provided. The example position sensing component 400 may be similar to the position sensing component 300 described above in connection with FIG. 3. As shown in FIG. 4, the example portion of a position sensing component 400 comprises an oscillator circuit 402, a feedback control circuit 404, a health monitoring circuit 406 and a linearization circuit 408.

As depicted in FIG. 4, the example position sensing component 400 comprises an oscillator circuit 402 configured to provide an electrical output/signal to drive a sensing coil in conjunction with a moveable core. In various embodiments, the example oscillator circuit 402 may provide a variable current signal to drive the sensing coil and moveable core such that a fixed amplitude voltage across the sensing coil is maintained. In various examples, the current draw required to maintain a fixed amplitude voltage is linearly proportional to the position of the moveable core with respect to the sensing coil. In some examples, as depicted, the oscillator circuit 402 comprises a modified Colpitts oscillator circuit. However, other types of circuits may be utilized. In one example, the inductance of the example sensing coil may vary between 5 mH and 50 mH in response to a movement of the moveable core. In various embodiments, the oscillator frequency may be tuned for a particular application by adjusting the sensing coil inductance and fixed capacitor values of the oscillator circuit 402.

As depicted in FIG. 4, the example position sensing component 400 comprises a feedback control circuit 404. In various examples, the feedback control circuit 404 may be configured to receive an oscillator output signal and provide a feedback output signal in return so as to modulate the output of the oscillator circuit 402. As noted above, as the reluctance/impedance of the example sensing coil changes in response to displacement of the moveable core, a variable current signal drawn by the sensing coil will increase in order to maintain a target voltage (i.e., a fixed amplitude voltage). In various examples, the feedback control circuit 404 may be configured to monitor a variable current output/signal so as to control the operation of the oscillator circuit 402. In turn, a linear output signal corresponding with a displacement of the moveable core with respect to the sensing coil can be obtained. As depicted, the example feedback control circuit 404 uses an operational amplifier gain to maintain a 10Vp-p oscillation. For example, if the feedback control circuit 404 detects that the magnitude of the oscillator output signal is decreasing, the voltage output of the operational amplifier may be increased. Conversely, if the feedback control circuit 404 detects that the magnitude of the oscillator output signal is increasing, the voltage output of the operational amplifier may be decreased. Additionally, as depicted, a diode may be utilized to prevent overshoot of the oscillator output signal.

In some embodiments, as depicted in FIG. 4, the position sensing component 400 comprises a health monitoring circuit 406. The example health monitoring circuit 406 may be configured to monitor a variable current signal used by the oscillator circuit 402 to maintain a target voltage (i.e., fixed amplitude voltage). As such, the health monitoring circuit 406 may be utilized to monitor output characteristics indicative of the health of the example position sensing component 400. In turn, these output characteristics may be processed to provide defined output ranges for target output values and outside-of-range output values associated with the position sensing component 400. For example, in various embodiments, the example health monitoring circuit 406 may be or comprise a comparator circuit configured to generate signals corresponding to various outside-of-range conditions including, but not limited to, temperature conditions, high impedance, an open sensing coil, low impedance, a short sensing coil condition, and/or the like. By way of example, the oscillator circuit output signal detected by the health monitoring circuit 406 may be very high in response to an open sensing coil condition or very low in response to a short sensing coil condition. As depicted in FIG. 4, the health monitoring circuit 406 comprises a MOSFET to provide switching capabilities. In various examples, as depicted, a decoupling capacitor and diodes operate to pull the electrical signal to 5V if the oscillator stops working and pull the electrical signal to approximately 1.8V when operational. In various embodiments, the health monitoring circuit 406 may be modified to include multiple states and/or multiple bits for a plurality of conditions.

As depicted in FIG. 4, the position sensing component 400 comprises a linearization circuit 408 configured to further linearize the electrical signal/output of the oscillator circuit 402. As discussed above, while the output of the position sensing component 400 is inherently linear, in some applications, a linearization circuit 408 may be provided (e.g., in order to provide additional temperature compensation capabilities). In some examples, as depicted, the linearization circuit 408 may comprise a low-pass filter circuit utilizing a 2-pole filter to smooth an oscillator output signal into a DC voltage signal. In various embodiments, the linearization circuit 408 may be modified to provide additional and/or more complex filtering capabilities (e.g., more poles, active filtering, and/or the like). In various examples, as depicted in FIG. 4, the linearization circuit 408 also comprises an instrumentation amplifier circuit and a reference voltage circuit configured to adjust the filtered output of the oscillator into a useable 0-5 VDC output signal (e.g., for providing information/data).

While some of the embodiments herein provide an schematic circuit diagram depicting an example position sensing component 400, it is noted that the present disclosure is not limited to such embodiments. For instance, in some examples, position sensing component 400 and corresponding schematic circuit diagram in accordance with the present disclosure may comprise other elements one or more additional and/or alternative elements, and/or may be structured/positioned differently than that illustrated in FIG. 4.

Figure 5:
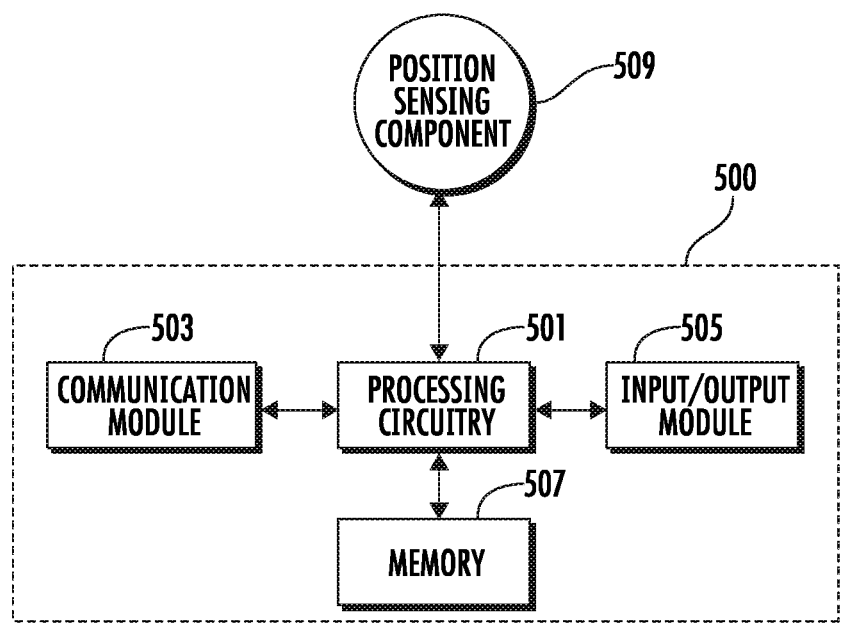
FIG. 5 illustrates an example controller component in electronic communication with an example position sensing component in accordance with various embodiments of the present disclosure.

Referring now to FIG. 5, a schematic diagram depicting an example controller component 500 in electronic communication with a position sensing component 509 in accordance with various embodiments of the present disclosure is provided. The position sensing component 509 may be similar to the position sensing component 300 discussed above in connection with FIG. 3. As shown, the controller component 500 comprises processing circuitry 501, a communication module 503, input/output module 505, a memory 507 and/or other components configured to perform various operations, procedures, functions or the like described herein. In some examples, the controller component 500 may be operatively coupled with the position sensing component or remote from the position sensing component 509.

As depicted, the controller component 500 (such as the processing circuitry 501, communication module 503, input/output module 505 and memory 507) is electrically coupled to and/or in electronic communication with a position sensing component 509. The position sensing component 509 may exchange (e.g., transmit and receive) data in the form of electrical signals with the processing circuitry 501 of the controller component 500.

The processing circuitry 501 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as application-specific integrated circuits (ASICs) or field-programmable gate arrays (FPGAs), or a certain combination thereof). In some embodiments, the processing circuitry 501 may comprise one or more processors. In one exemplary embodiment, the processing circuitry 501 is configured to execute instructions stored in the memory 507 or otherwise accessible by the processing circuitry 501. When executed by the processing circuitry 501, these instructions may enable the controller component 500 to execute one or a plurality of the functions as described herein. Whether it is configured by hardware, firmware/software methods, or a combination thereof, the processing circuitry 501 may comprise entities capable of executing operations according to the embodiments of the present invention when correspondingly configured. Therefore, for example, when the processing circuitry 501 is implemented as an ASIC, an FPGA, or the like, the processing circuitry 501 may comprise specially configured hardware for implementing one or a plurality of operations described herein. Alternatively, as another example, when the processing circuitry 501 is implemented as an actuator of instructions (such as those that may be stored in the memory 507), the instructions may specifically configure the processing circuitry 501 to execute one or a plurality of algorithms and operations, some of which are described herein.

The memory 507 may comprise, for example, a volatile memory, a non-volatile memory, or a certain combination thereof. Although illustrated as a single memory in FIG. 5, the memory 507 may comprise a plurality of memory components. In various embodiments, the memory 507 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 507 may be configured to store information, data, application programs, instructions, and etc., so that the controller component 500 can execute various functions according to the embodiments of the present disclosure. For example, in at least some embodiments, the memory 507 is configured to cache input data for processing by the processing circuitry 501. Additionally or alternatively, in at least some embodiments, the memory 507 is configured to store program instructions for execution by the processing circuitry 501. The memory 507 may store information in the form of static and/or dynamic information. When the functions are executed, the stored information may be stored and/or used by the controller component 500.

The communication module 503 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 507) and executed by a controller component 500 (for example, the processing circuitry 501). In some embodiments, the communication module 503 (as with other components discussed herein) may be at least partially implemented as the processing circuitry 501 or otherwise controlled by the processing circuitry 501. In this regard, the communication module 503 may communicate with the processing circuitry 501, for example, through a bus. The communication module 503 may comprise, for example, antennas, transmitters, receivers, transceivers, network interface cards and/or supporting hardware and/or firmware/software, and is used for establishing communication with another apparatus. The communication module 503 may be configured to receive and/or transmit any data that may be stored by the memory 507 by using any protocol that can be used for communication between apparatuses. The communication module 503 may additionally or alternatively communicate with the memory 507, the input/output module 505 and/or any other component of the controller component 500, for example, through a bus.

In some embodiments, the controller component 500 may comprise an input/output module 505. The input/output module 505 may communicate with the processing circuitry 501 to receive instructions input by the user and/or to provide audible, visual, mechanical or other outputs to the user. Therefore, the input/output module 505 may be in electronic communication with supporting devices, such as a keyboard, a mouse, a display, a touch screen display, and/or other input/output mechanisms. Alternatively, at least some aspects of the input/output module 505 may be implemented on a device used by the user to communicate with the controller component 500. The input/output module 505 may communicate with the memory 507, the communication module 503 and/or any other component, for example, through a bus. One or a plurality of input/output modules and/or other components may be included in the controller component 500. In various examples, the example position sensing component 509 may generate electrical outputs/signals comprising information/data and transmit electrical outputs/signals to the processing circuitry 501. The example position sensing component 509 may generate system information and transmit indications (e.g., electrical signals describing the system information) to the processing circuitry 501.

In an example braking system, data/information may include safety warnings (e.g., indicating that the moveable core is not properly positioned), system status information (e.g., braking mechanism change information), and/or various other parameters of the system. The example position sensing component 509 may be used in conjunction with an Analog-to-Digital converter (ADC) and configured to provide a wired or wireless digital output/signal (e.g., RS-485, BLE, and/or the like).

Figure 6:
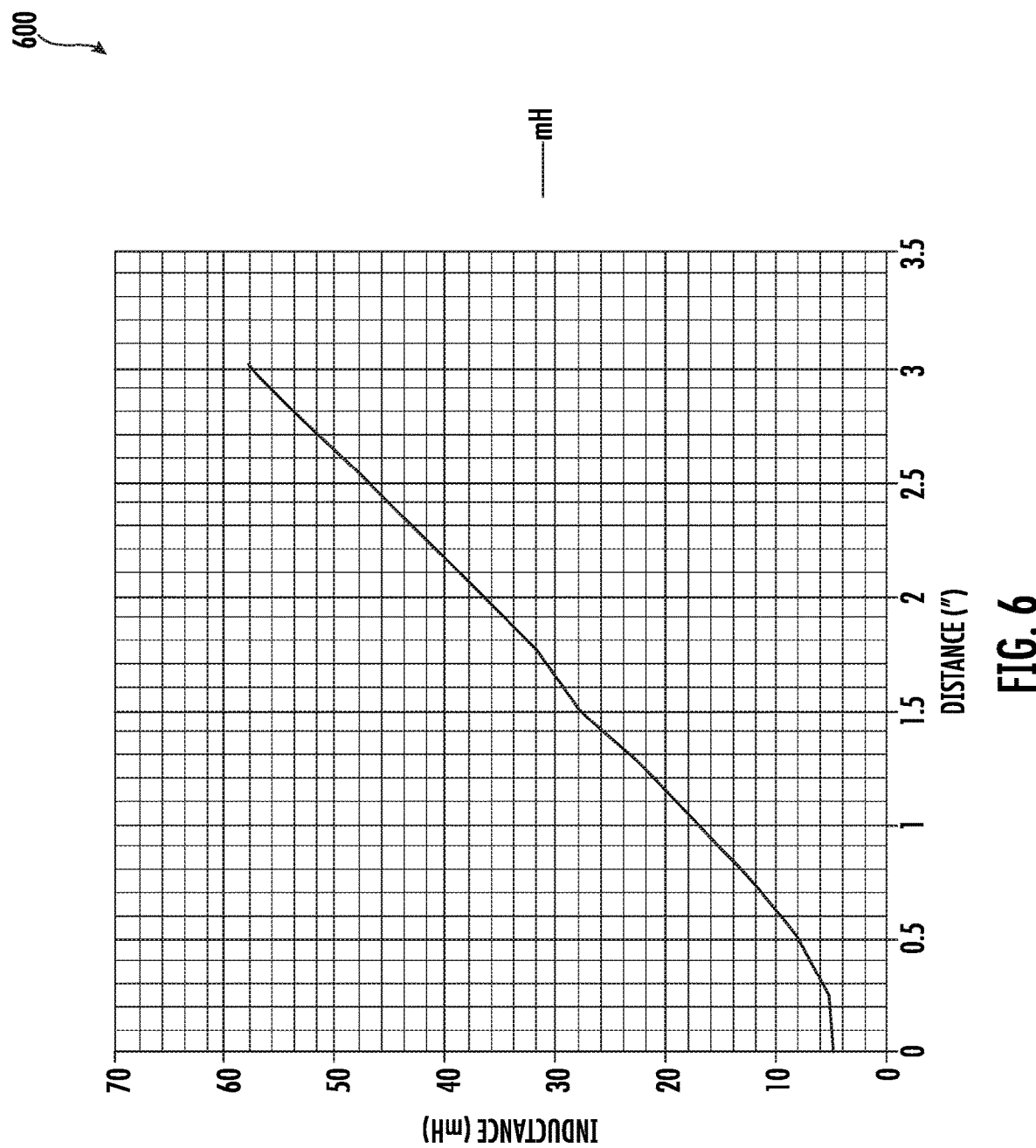
FIG. 6 illustrates a graphical representation depicting experimental results in accordance with various embodiments of the present disclosure.

Referring now to FIG. 6, a graphical representation 600 depicting experimental results of an example position sensing component in accordance with various embodiments of the present disclosure is provided. The example position sensing component may be similar to the position sensing component 300 described above in connection with FIG. 3 above, and elsewhere herein.

As depicted in FIG. 6, the x-axis represents a position reflecting a displacement value/distance (inches) of the moveable core with respect to the sensing coil. As depicted, the y-axis represents inductance (mH) of the example sensing coil. As noted above, and as depicted in FIG. 6, the inductance of the example sensing coil changes linearly with respect to movement of the moveable coil disposed therein. The inductance values with respect to the position of the moveable coil are provided in Table 1 below:

TABLE 1

Inductance of sensing coil based on position of moveable core with respect to sensing coil.

| Position (inches) | Inductance (mH) |
|---|---|
| 0 | 4.843 |
| 0.25 | 5.291 |
| 0.5 | 8.03 |
| 0.75 | 12.326 |
| 1 | 17.207 |
| 1.25 | 22.394 |
| 1.5 | 28.007 |
| 1.75 | 31.69 |
| 2 | 36.809 |
| 2.25 | 42.293 |
| 2.5 | 47.608 |
| 2.75 | 53.083 |
| 3 | 58.026 |

Accordingly, in various embodiments, the example position sensing component provides an electrical signal/output that is linearly proportional to a position of the moveable core with respect to the sensing coil without the use of permanent magnets.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A position sensing component comprising:
    a sensing coil;
    a moveable core;
    an oscillator circuit;
    a feedback control circuit coupled to the oscillator circuit, wherein the position sensing component is configured to:
        maintain a fixed amplitude voltage in response to a variable current signal provided by the oscillator circuit in conjunction with the feedback control circuit, and
        generate an oscillator output signal;
    a health monitoring circuit configured to provide an oscillator status output signal, wherein the position sensing component is operatively coupled with a controller component, wherein the oscillator status output signal is transmitted to the controller component; and
    a linearization circuit comprising a low-pass filter circuit utilizing a 2-pole filter to smooth the oscillator output signal into a direct-current (DC) voltage signal.

2. The position sensing component of claim 1, wherein the oscillator circuit is configured to provide the variable current signal to drive the sensing coil in conjunction with the moveable core.

3. The position sensing component of claim 2, wherein the oscillator output signal is further linearized by passing the oscillator output signal through the linearization circuit.

4. The position sensing component of claim 1, wherein the linearization circuit comprises an amplifier circuit.

5. The position sensing component of claim 3, wherein the linearization circuit further comprises temperature compensation.

6. The position sensing component of claim 1, wherein the oscillator circuit comprises a modified Colpitts oscillator.

7. The position sensing component of claim 2, wherein the health monitoring circuit comprises a metal-oxide-semiconductor field-effect transistor (MOSFET) switch.

8. The position sensing component of claim 1, wherein the position sensing component comprises a direct-current (DC) input or a DC output.

9. The position sensing component of claim 1, wherein the position sensing component comprises an analog-to-digital-converter (ADC).

10. A method for measuring a position of a moveable core with respect to a sensing coil of a position sensing component, the method comprising:
    generating, by an oscillator circuit, an oscillator output signal;
    generating, by a health monitoring circuit, an oscillator status output signal, wherein the position sensing component is operatively coupled with a controller component, and wherein the oscillator status output signal is transmitted to the controller component; and
    utilizing a 2-pole filter of a low-pass filter circuit to smooth the oscillator output signal into a direct-current (DC) voltage signal.

11. The method according to claim 10, the oscillator circuit configured to provide a variable current signal to drive the sensing coil in conjunction with the moveable core.

12. The method according to claim 11, further comprising:
    linearizing, by a linearization circuit, the oscillator output signal.

13. The method according to claim 12, wherein the linearization circuit comprises the low-pass filter circuit and an amplifier circuit.

14. The method according to claim 13, wherein the linearization circuit further comprises temperature compensation.

15. The method according to claim 11, wherein the oscillator circuit comprises a modified Colpitts oscillator.

16. The method according to claim 11, wherein the health monitoring circuit comprises a metal-oxide-semiconductor field-effect transistor (MOSFET) switch.

17. The method of claim 11, wherein the position sensing component comprises a direct-current (DC) input or a DC output.

18. The method according to claim 11, wherein the position sensing component comprises an analog-to-digital-converter (ADC).

* * * * *